(12) United States Patent
Dupont et al.

(10) Patent No.: US 8,569,410 B2
(45) Date of Patent: Oct. 29, 2013

(54) PROCEDURE FOR MANUFACTURING AN AQUEOUS FORMULATION BASED ON A SOLUTION OF ACRYLIC COMB POLYMER AND ACRYLIC THICKENING EMULSION, THE FORMULATION OBTAINED AND ITS USE IN COATING PAPER

(75) Inventors: Francois Dupont, Lyons (FR); Jean-Marc Suau, Lucenay (FR)

(73) Assignee: Coatex S.A.S., Genay (FR)

( * ) Notice: Subject to any disclaimer, the term of this patent is extended or adjusted under 35 U.S.C. 154(b) by 477 days.

(21) Appl. No.: 12/663,413

(22) PCT Filed: May 28, 2008

(86) PCT No.: PCT/IB2008/001545
§ 371 (c)(1),
(2), (4) Date: Dec. 7, 2009

(87) PCT Pub. No.: WO2008/149226
PCT Pub. Date: Dec. 11, 2008

(65) Prior Publication Data
US 2010/0184897 A1   Jul. 22, 2010

(30) Foreign Application Priority Data
Jun. 8, 2007   (FR) ...................................... 07 04092

(51) Int. Cl.
*C08K 5/10*   (2006.01)
*C08K 3/34*   (2006.01)

(52) U.S. Cl.
USPC ........... 524/315; 524/425; 524/447; 524/451; 524/500; 524/522

(58) Field of Classification Search
USPC .................. 524/315, 425, 447, 500, 451, 522
See application file for complete search history.

(56) References Cited

U.S. PATENT DOCUMENTS

| 4,780,500 | A | 10/1988 | Sinka et al. |
| 6,599,973 | B1 * | 7/2003 | Visscher et al. ............ 524/504 |
| 7,754,804 | B2 | 7/2010 | Mukherjee et al. |

| 2002/0156179 | A1 | 10/2002 | Egraz et al. |
| 2003/0144408 | A1 | 7/2003 | Egraz et al. |
| 2006/0106186 | A1 | 5/2006 | Dupont et al. |
| 2006/0142498 | A1 | 6/2006 | Gane et al. |
| 2007/0117903 | A1 * | 5/2007 | Mukherjee et al. ........... 524/460 |

FOREIGN PATENT DOCUMENTS

| EP | 1 565 504 A1 | 8/2005 |
| EP | 1 569 970 A1 | 9/2005 |
| EP | 1 651 693 B1 | 12/2006 |
| JP | 2000-313846 A | * 11/2000 |
| JP | 2006-348112 A | * 12/2006 |
| WO | 2004 041883 | 5/2004 |
| WO | 2004 044022 | 5/2004 |

OTHER PUBLICATIONS

Office Action issued Nov. 13, 2012 in Japanese Patent Application No. 2010-510906 (English-language translation only).

\* cited by examiner

*Primary Examiner* — Robert D. Harlan
(74) *Attorney, Agent, or Firm* — Oblon, Spivak, McClelland, Maier & Neustadt, L.L.P.

(57) ABSTRACT

This invention relates to a process for producing a composition characterized in that it comprises the steps of:

a) preparing an aqueous solution of at least one comb polymer of (meth)acrylic acid onto which is grafted a function of alkoxy and/or hydroxy polyalkylene glycol, b) preparing an aqueous emulsion of at least one acrylic thickener, c) mixing the aqueous solution from step a) with the aqueous emulsion from step b), possibly adding water, and in that one partially neutralizes the comb polymer during step a) and/or step c), in such a way as to obtain a mixture whose pH is between 5.5 and 6.8, preferentially between 5.8 and 6.3.

The invention also concerns the product obtained and its utilization in a paper coating for paper, as a thickening agent for said coating and/or as a water retention agent for said coating and/or as an agent improving the brightness and/or the optical azuration of the paper coated with said coating.

20 Claims, No Drawings

PROCEDURE FOR MANUFACTURING AN AQUEOUS FORMULATION BASED ON A SOLUTION OF ACRYLIC COMB POLYMER AND ACRYLIC THICKENING EMULSION, THE FORMULATION OBTAINED AND ITS USE IN COATING PAPER

The present invention relates to the field of paper, more precisely the compositions that allow coating of the paper's surface, further referred to as paper coatings.

Within the framework of producing a sheet of paper by coating it, an aqueous compound called a "paper coating" is deposited on the surface of the support paper, which notably contains water, one or more mineral fillers, one or more binders and various additives.

A first important characteristic of a paper coating resides in its rheological behavior: It is indeed of interest to deposit paper coatings that can be regulated and particularly to increase viscosity on large value ranges in order to conform to the requirements of the end user and to the coating process parameters. For this purpose agents known as "thickeners" are applied in said coatings.

For several years, the person skilled in the art knew the particular category of acrylic thickeners, comprised of homopolymers and copolymers of (meth)acrylic acid with other monomers, and particularly of acrylic thickeners of the ASE (Alkali Swellable Emulsion) and HASE (Hydrophobically modified Alkali Swellable Emulsion) types. The first designates thickeners in emulsion that are homopolymers or copolymers of (meth)acrylic acid with an ester of these acids, and the second designates thickeners in emulsion that are copolymers based on (meth)acrylic acid, an ester of these acids and a hydrophobic monomer.

At the same time, there is a second fundamental property of paper coatings to this rheological aspect: their water retention. After being deposited on the support paper, this coating has a natural tendency to transfer into the support all or part of the water and water-soluble substances it contains. One therefore seeks to maximum reduction of the water and water-soluble substances, in order to avoid a rheological change in the paper coating that is unused and recycled in the coating process. One therefore refers to a water retention phenomenon that one seeks to improve, that is to increase. To this end, "water retaining" agents are used, which are classically made of starch, polyvinyl alcohol, polymers based on carboxymethyl cellulose, as well as latex or highly carboxylic polymer emulsions or also polycarboxylates such as polyacrylates.

When viewing the final product (that is, the coated paper) the person skilled in the art is particularly sensitive to obtaining a third type of property: optical characteristics of the sheet of coated paper, particularly the its brightness and its optical azuration (that its, its whiteness). Therefore brightness activators are used, such as acrylic polymers and a combination of optical brighteners (fluorescent substances based on stylbenic molecules) with brightness supports, such as acrylic polymers, polyvinyl alcohol or polymers based on carboxymethyl cellulose.

Habitually, all of the aforementioned additives (thickeners, water retention agents, brightness activators, optical azuration activators) as well as mineral fillers, water and binders that make up the paper coating are mixed and homogenized under strong agitation in a reactor. This state of the art represents a complex, costly process, with regard to the number of additives to be used to optimize the rheological properties of the coating (thickening and water retention) and the optical properties of the coated paper (brightness and azuration activation), and with regard to the energy used to mix the constituents and to obtain a uniform paper coating.

In order to compensate for these disadvantages, the Applicant has developed a new production process for an aqueous formulation characterized in that it includes the steps of:
a) preparing an aqueous solution of at least one comb polymer 1) of (meth)acrylic acid onto which is grafted a function of alkoxy and/or hydroxy polyalkylene glycol,
b) preparing an aqueous emulsion of at least one acrylic thickener 2),
c) mixing the aqueous solution from step a) with the aqueous emulsion from step b), possibly adding water,
and in that one partially neutralizes the comb polymer during step a) and/or step c), in such a way as to obtain a mixture whose pH is between 5.5 and 6.8, preferentially between 5.8 and 6.3.

One thus has a unique, stable, handling product that allows, at the same time, improvement in the rheological properties of the paper coating, and particularly an increase in its water retention as well as its Brookfield™ viscosity on a broad value interval, while improving the optical properties of the coated paper, particularly its brightness and optical azuration.

The Applicant recognizes that the comb polymer a) is already known as an agent that improves the optical azuration of coated papers (as described in document WO 2004/044022), as well as their brightness (as described in document WO 2004/041883), and that it is also known as an agent that improves water retention in paper coatings (according to the French patent application not yet filed and published under number FR 05 12797). However, it does not allow one to reach high Brookfield™ viscosities if it is implemented without a thickener in a paper coating: This is indicated by the document published under number FR 05 12797 and mentioned in document WO 2004/041883, which demonstrates even without its examples the need to add a thickening agent to the coating, as in the case of a carboxymethyl cellulose.

In pursuing research intended to provide a product that simultaneously behaves as an effective thickener and water retention agent in the paper coating to which it is introduced, while giving the sheet of paper coated by said coating very good optical properties (brightness, azuration activation), the Applicant has succeeded in developing a process for producing such a product. This process is based mainly on the mixture of water with an aqueous solution of an acrylic comb polymer and an aqueous emulsion of an acrylic thickener: Quite surprisingly, this mixture of an emulsion and a solution leads to a stable product on the one hand, and on the other hand one whose viscosity is makes it perfectly handling by the user.

In this Application, the expression "aqueous solution" designates, in general, a homogenous mixture of water with at least one other substance, thus the expression "aqueous emulsion" designates a stable mixture of water and another substance that is not miscible with water.

Quite surprisingly, it is the selection of the rate of neutralization of acrylic comb polymer a) that has allowed development of a process that allows arrival at a stable product that nonetheless results from the mixture of an emulsion and an aqueous solution; although the person skilled in the art well knows that the mixture of an emulsion and an aqueous solution can lead to a very unstable product. In addition, it is also this selection that has allowed obtention of a product that is handling by the end user, that is, whose Brookfield™ viscosity at 100 rotations per minute and at 25° C. remains less than 1,500 mPa·s. These properties are clearly exemplified in the present Application.

But nothing in the prior art revealed or suggested such a selection for the purpose of resolving the technical problem that is the subject of this Application. Even the documents previously cited and that relate to the conditions used by the acrylic comb polymer a) in the field of paper, did not suggest to the person skilled in the art that they be combined in the form of a single product with an acrylic thickener. They also do not call for its partial neutralization rather than implementing it in a completely neutralized form. A fortiori, these documents do not suggest any particular neutralization rate for said acrylic comb polymer a) in order to resolve the problem that is the subject of this Application.

Finally in a surprising manner, the development of the process according to the invention has led to a unique product in which the intrinsic properties brought by each of its constituents are preserved: increased viscosity due to the thickener b) and improved water retention, brightness and the activation of optical azuration due to the acrylic comb polymer a). On the one hand, none of the documents mentioned above owing to the acrylic comb polymer a) disclosed anything but the optical properties (brightness and azuration) and the water retention that it brings could be maintained if said polymer was neutralized according to the present invention. On the other hand, it is also worthy of notice that the properties brought by each of the two constituents are maintained until they are mixed: The person skilled in the art knows well that in regard to the formulation, the interactions between the constituents of a single product are numerous and can mask one or more of the properties brought by one of those constituents.

Also, a first object of the invention is a method for manufacturing an aqueous formulation characterized in that it comprises the steps of:
  a) preparing an aqueous solution of at least one comb polymer 1) of (meth)acrylic acid onto which is grafted a function of alkoxy and/or hydroxy polyalkylene glycol,
  b) preparing an aqueous emulsion of at least one acrylic thickener 2),
  c) mixing the aqueous solution from step a) with the aqueous emulsion from step b), possibly adding water,
and in that one partially neutralizes the comb polymer during step a) and/or step c), in such a way as to obtain a mixture whose pH is between 5.5 and 6.8 preferentially between 5.8 and 6.3.

This process is also characterized in that the formulation resulting from stage c) presents dry material content comprising between 20% and 35% of its total weight.

This process is also characterized in that the formulation resulting from stage c) presents dry weight material content of comb polymer 1) used during step a) comprising between 70% and 95%, preferentially between 80% and 90% of its total dry material.

This process is also characterized in that the mixture resulting from stage c) presents a Brookfield™ viscosity, measured at 25° C. and at 100 rotations per minute, less than 1,500 mPa·s, preferentially 1,200 mPa·s, very preferentially 1,000 mPa·s.

This process is also characterized in that the acrylic thickener 2) used during stage b) is a thickener of the ASE (alkali-soluble emulsion) or HASE (hydrophobically modified alkali-soluble emulsion) type.

This process is also characterized in that within the comb polymer 1) used during stage a), the hydroxy and/or hydroxy polyalkylene glycol function is brought by a formula (I) monomer:

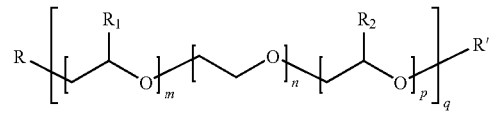

in which:
  m, n, p and q are integers and m, n, p≤150, q≥1 and 5≤(m+n+p)q≤150,
  $R_1$ represents hydrogen or the methyl or ethyl radical,
  $R_2$ represents hydrogen or the methyl or ethyl radical,
  R represents a radical containing a polymerizable unsaturated function, preferentially belonging to the group of vinylics as well as the group of acrylic, methacrylic, and maleic esters, as well as to the group of unsaturated urethanes such as acrylurethane, methacrylurethane, α-α' dimethyl-isopropenyl-benzylurethane, allylurethane, as well as to the group of allylic or vinylic ethers, whether substituted or not, or to the group of ethylenically unsaturated amides or imides,
  R' represents hydrogen or a hydrocarbonated radical having 1 to 40 carbon atoms, or an ionic or ionizable group such as a phosphate, a phosphonate, a sulfate, a sulfonate, a carboxylic, or also a primary, secondary or tertiary amine, or a quaternary ammonium, or a mixture thereof, and preferentially represents a hydrocarbon radical having 1 to 12 carbon atoms and very preferentially a hydrocarbon radical having 1 to 4 carbon atoms.

This process is also characterized in that the comb polymer 1) used during stage a) contains, as a percentage of weight of each of its constituents, the sum of the percentages equal to 100%, from 6% to 40%, preferentially from 6% to 15% of (meth)acrylic acid, from 60% to 94%, preferentially from 85% to 94% of a formula (I) monomer.

This process is also characterized in that the comb polymer 1) used during stage a), is partially neutralized by one or more neutralization agents preferentially chosen among the sodium and potassium hydroxides and mixtures thereof.

Another object of the invention is an aqueous formulation characterized in that it contains:
  1) at least one comb polymer of (meth)acrylic acid onto which is grafted a function of alkoxy and/or hydroxy polyalkylene glycol,
  2) at least one acrylic thickener,
  3) of water,
and in that the comb polymer is partially neutralized in such a way that the pH of said formulation is between 5.5 and 6.8, preferentially between 5.8 and 6.3.

This formulation is also characterized in that it presents dry material content comprising between 20% and 35% of its total weight.

This formulation is also characterized in that it presents a dry weight content of comb polymer 1) comprising between 70% and 95%, preferentially between 80% and 90% of its total dry material.

This formulation is also characterized in that it presents a Brookfield™ viscosity, measured at 25° C. and at 100 rotations per minute, less than 1,500 mPa·s, preferentially 1,200 mPa·s, very preferentially 1,000 mPa·s.

This formulation is also characterized in that the acrylic thickener 2) is an acrylic thickener of the ASE (alkali-soluble emulsion) or HASE (hydrophobically modified alkali-soluble emulsion) type.

This formulation is also characterized in that within the comb polymer 1), the alkoxy and/or hydroxy polyalkylene glycol function is brought by a formula (I) monomer:

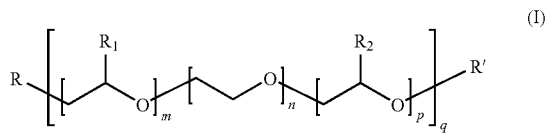

in which:
m, n, p and q are integers and m, n, p≤150, q≥1 and 5≤(m+n+p)q≤150,
$R_1$ represents hydrogen or the methyl or ethyl radical,
$R_2$ represents hydrogen or the methyl or ethyl radical,
R represents a radical containing a polymerizable unsaturated function, preferentially belonging to the group of vinylics as well as the group of acrylic, methacrylic, and maleic esters, as well as to the group of unsaturated urethanes such as acrylurethane, methacrylurethane, α-α' dimethyl-isopropenyl-benzylurethane, allylurethane, as well as to the group of allylic or vinylic ethers, whether substituted or not, or to the group of ethylenically unsaturated amides or imides,
R' represents hydrogen or a hydrocarbonated radical having 1 to 40 carbon atoms, or an ionic or ionizable group such as a phosphate, a phosphonate, a sulfate, a sulfonate, a carboxylic, or also a primary, secondary or tertiary amine, or a quaternary ammonium, or a mixture thereof, and preferentially represents a hydrocarbon radical having 1 to 12 carbon atoms and very preferentially a hydrocarbon radical having 1 to 4 carbon atoms.

This formulation is also characterized in that the comb polymer 1) contains, as a percentage of weight of each of its constituents, the sum of the percentages equal to 100%, from 6% to 40%, preferentially from 6% to 15% of (meth)acrylic acid, from 60% to 94%, preferentially from 85% to 94% of a formula (I) monomer.

This formulation is also characterized in that the comb polymer 1) is partially neutralized by one or more neutralization agents preferentially chosen among the sodium and potassium hydroxides and mixtures thereof.

Another object of the invention is the utilization of the aqueous formulation of the present invention in a paper coating, as a thickening agent for said coating and/or as a water retention agent for said coating and/or as an agent improving the brightness and/or the optical azuration of the paper coated with said coating.

The following examples serve to better appreciate the present invention, without, however, limiting its scope.

EXAMPLES

In all examples, the molecular weight of the polymers used is determined based on the method explained below, using triple-detection Size Exclusion Chromatography (3D-SEC).
The 3D-SEC Chain is Composed as Follows:
an online degasser for mobile phase ERC 3112,
a Waters 515 or Viscotek VE1121 isocratic pump,
a Waters 717+ automatic injector,
a Waters CHM column oven,
a set of 3 Waters Ultrahydrogel columns 30 cm long and with an internal diameter of 7.8 mm, 1 linear column followed by 2 120 Å columns, all preceded by a guard column of the same nature,
a set of detectors connected in parallel: Viscotek T60A combining an LS and viscometry and a Waters 2410 differential refractometer,
computer and software system: Viscotek TriSEC 3.0 GPC software.
Composition of the Mobile Phase:
preparation of a stock solution: $Na_2SO_4$ 666 mM, filtered at 0.1 μm,
preparation of the mobile phase at 66.6 mM in $Na_2SO_4$ (or an ionic force of 0.2 M),
10% in volume of the preceding stock solution,
5% in volume of the acetonitrile,
85% in volume of water at 18.2 MΩ,
pH adjusted to 9.0 with some drops of sodium hydroxide N.
Operational Parameters:
flow: 0.8 ml/min,
temperature of the refractometer columns: 40° C.,
injection volume: 100 μl,
polymer concentration at injection: 2 to 4 mg/ml depending on the average molecular mass expected for each sample (optimization of detector responses),
length of analysis: 50 min.
Calibration of Detectors:
Use of Two Certified Calibrations:
Viscotek PEO22k, a standard of low polydispersity (Ip) for calibration of the system proper,
Viscotek Dextran T70k, a standard of high polydispersity (Ip) for verification and fine tuning of the calibration.

Example 1

This example is to illustrate the process according to the invention, and particularly the influence of the partial neutralization of the acrylic comb polymer a) of the stability and viscosity of the mixture obtained according to said process.

This example also illustrates the aqueous formula according to the invention.

For each of the tests, No. 1 through 10, an aqueous formulation was produced through the following steps:
a) preparing an aqueous solution of at least one comb polymer of (meth)acrylic acid onto which is grafted a function of alkoxy and/or hydroxy polyalkylene glycol,
b) preparing an aqueous emulsion of at least one acrylic thickener that is a copolymer of the acid (methacrylic) with at least one other monomer,
c) mixing the aqueous solution from step a) with the aqueous emulsion from step b), possibly adding water,
and one partially neutralizes the comb polymer during stage a), due to the sodium hydroxide (in tests No. 1 through 20) or to the potash (in tests No. 27 through 34), in such a way as to obtain the given pH value for the final mixture.

The comb polymer of stage a) consists (expressed as a percentage of the weight of each monomer) of 6% acrylic acid, 1.8% methacrylic acid, 92.2% formula (I) monomer in which $R_1$ and $R_2$ represent hydrogen, R represents the methacrylate group, R' represents the methyl radical, and with (m+n+p)q=113. Its molecular weight is equal to 1,850,000 g/mol.

The thickener from stage b) is an ASE type acrylic thickener marketed by the COATEX™ company under the name Rheocoat™ 35.

For tests No. 1 through 10, the mixture consists of 22.5% dry weight of acrylic comb polymer a), 2.5% dry weight of Rheocoat™ 35 and 75% water. For tests No. 11 through 20, the mixture consists of 20% dry weight of acrylic comb polymer a), 5% dry weight of Rheocoat™ 35 and 75% water.

For each of tests No. 1 through 34, charts 1 to 4 show the pH value of the mixture; its stability was observed over a period of 8 days, and its Brookfield™ viscosity was measured at 25° C. at 100 rotations per minute (μ 100 in (mPa·s).

| Test No. | pH | $\mu_{100}$ | stability |
|---|---|---|---|
| 1 | 2.3 | 520 | unstable |
| 2 | 3.3 | 535 | unstable |
| 3 | 4.3 | 500 | unstable |
| 4 | 5.3 | 550 | unstable |
| 5 | 5.5 | 550 | stable |
| 6 | 5.8 | 690 | stable |
| 7 | 6.3 | 885 | stable |
| 8 | 6.8 | 1440 | stable |
| 9 | 7.3 | 2335 | stable |
| 10 | 10.8 | 3215 | stable |
| 11 | 2.3 | 565 | unstable |
| 12 | 3.3 | 485 | unstable |
| 13 | 4.3 | 515 | unstable |
| 14 | 5.3 | 570 | unstable |
| 15 | 5.5 | 690 | stable |
| 16 | 5.8 | 705 | stable |
| 17 | 6.3 | 875 | stable |
| 18 | 6.8 | 1365 | stable |
| 19 | 7.3 | 1990 | stable |
| 20 | 10.8 | 2925 | stable |

Charts 1 and 2: neutralization by sodium hydroxide of the comb polymer a)—case of a mixture containing 22.5% and 2.5% dry weight respectively of comb polymer a) and of Rheocoat™ 35 b), and of a mixture containing 20% and 5% dry weight respectively of comb polymer a) and Rheocoat™ 35 b).

| Test No. | pH | $\mu_{100}$ | stability |
|---|---|---|---|
| 21 | 2.3 | 520 | unstable |
| 22 | 3.3 | 510 | unstable |
| 23 | 4.35 | 510 | unstable |
| 24 | 5.3 | 560 | unstable |
| 25 | 6.3 | 700 | stable |
| 26 | 7.3 | 2095 | stable |
| 27 | 8.6 | 3370 | stable |
| 28 | 2.3 | 565 | unstable |
| 29 | 3.3 | 510 | unstable |
| 30 | 4.35 | 515 | unstable |
| 31 | 5.3 | 540 | unstable |
| 32 | 6.3 | 640 | stable |
| 33 | 7.3 | 1630 | stable |
| 34 | 8.6 | 2400 | stable |

Charts 3 and 4: neutralization by potash of the comb polymer a)—case of a mixture containing 22.5% and 2.5% dry weight respectively of comb polymer a) and of Rheocoat™ 35 b), and of a mixture containing 20% and 5% dry weight respectively of comb polymer a) and Rheocoat™ 20 b).

These results demonstrate well the neutralization rate of the comb polymer a), in the sense that the pH of the final mixture resulting from the neutralization of the comb polymer must be between 5.5 and 6.8 to obtain a product that is both stable and whose Brookfield™ viscosity is less than 1,500 (mPa·s at 25° C. and at 100 rotations per minute.

Example 2

This example illustrates the procedure according to the invention, the aqueous formulation thus obtained, and its use in a paper coating, in order to improve notably its water retention and its Brookfield™ viscosity, as well as the optical properties of the sheet of paper coated with that coating, in particular its brightness and whiteness.

Aqueous Formulations According to the Invention

For each of tests No. 35 through 65, one began by producing an aqueous formulation through the following steps:
a) preparing an aqueous solution of at least one comb polymer of (meth)acrylic acid onto which is grafted a function of alkoxy and/or hydroxy polyalkylene glycol,
b) preparing an aqueous emulsion of at least one acrylic thickener that is a copolymer of the acid (methacrylic) with at least one other monomer,
c) mixing the aqueous solution from step a) with the aqueous emulsion from step b), possibly adding water.

The acrylic comb polymer is neutralized either at the level of step a), or at the level of step c), in such a way that the mixture's pH is between 5.5 and 6.5.

For each of these aqueous formulations, the pH, the Brookfield™ viscosity at 100 rotations per minute at 25° C. and the stability were measured for 8 days.

Paper Coatings

For each of these tests, a paper coating was made consisting of:
 100 parts by weight of calcium carbonate marketed by the OMYA™ company under the name Setacarb™ HG,
 0.45% by dry weight (in relation to the dry weight of calcium carbonate) of the aqueous solution to be tested, according to the prior art of the invention,
 10.5% in dry weight (in relation to the dry weight of calcium carbonate), of a latex styrene-butadiene marketed by the Dow™ Chemical Company under the name DL 966,
 0.25% in dry weight (in relation to the dry weight of calcium carbonate), of a polyvinyl alcohol marketed by the CLARIANT™ company under the name Mowiol™ 4-98,
 0.06% in dry weight (in relation to the dry weight of calcium carbonate), of an optical azurant marketed by the BAYER™ company under the name Blancophor™ P, The dry extract of said coating is fixed at 69% of its total weight.

For Each Coating are Determined:
 the Brookfield™ viscosity at 10 and 100 rotations per minute at 25° C.,
 the ACAV viscosity under a shear gradient equal to 10 s$^{-1}$ and at 25° C.,
 its water retention with an AAGWR device marketed by the GRADEK™ company, according to the method described in French patent application No. 05 12797 already cited in this document.

Coated Paper

Each of the paper coatings was used to coat a paper with a weight of 78 g/m$^2$. The coating was made by means of a pilot coater with a scraping blade that allows deposit onto the support weight of paper coating equal to 12±1 g/m$^2$. The coated paper obtained was then calendered by 3 passages of pressure at 80° C. and at 40 bars. Thus was determined:
 the TAPPI 75° brightness according to norm TAPPI T480 OS-78,
 the W(CIE) whiteness according to norm ISO/FDIS 11475, this whiteness being representative of the degree of optical azuration of the coated paper.

Tests

As a result of these tests, one refers to the following:
Polymer A1, an acrylic comb polymer consisting (as a percentage of the weight of each monomer) of 6% acrylic acid, 1.8% methacrylic acid, 92.2% formula (I) monomer in which $R_1$ and $R_2$ represent hydrogen, R represents the methacrylate group, R' represents the methyl radical, and with $(m+n+p)q=113$. Its molecular weight is equal to 250,000 g/mol.

Polymer A2, an acrylic comb polymer consisting (as a percentage of the weight of each monomer) of 15.0% acrylic acid, 5.0% methacrylic acid, 80.0% formula (I) monomer in which $R_1$ and $R_2$ represent hydrogen, R represents the methacrylate group, R' represents the methyl radical, and with $(m+n+p)q=113$. Its molecular weight is equal to 970,000 g/mol.

Polymer A3, an acrylic comb polymer consisting (as a percentage of the weight of each monomer) of 6% acrylic acid, 1.8% methacrylic acid, 92.2% formula (I) monomer in which $R_1$ and $R_2$ represent hydrogen, R represents the methacrylate group, R' represents the methyl radical, and with $(m+n+p)q=45$. Its molecular weight is equal to 1,250,000 g/mol.

Polymer A4, an acrylic comb polymer consisting (as a percentage of the weight of each monomer) of 6% acrylic acid, 1.8% methacrylic acid, 92.2% formula (I) monomer in which $R_1$ and $R_2$ represent hydrogen, R represents the methacrylate group, R' represents the methyl radical, and with $(m+n+p)q=17$. Its molecular weight is equal to 1,020,000 g/mol.

Polymer A5, an acrylic comb polymer consisting (as a percentage of the weight of each monomer) of 30.0% acrylic acid, 5.0% methacrylic acid, 65.0% formula (I) monomer in which $R_1$ and $R_2$ represent hydrogen, R represents the methacrylate group, R' represents the methyl radical, and with $(m+n+p)q=113$. Its molecular weight is equal to 1,850,000 g/mol.

Thickener B1, an HASE type acrylic thickener marketed by the COATEX™ company under the name Rheocoat™ 73.

Thickener B2, an ASE type acrylic thickener marketed by the COATEX™ company under the name Rheocoat™ 35.

Thickener B3, an HASE type acrylic thickener marketed by the COATEX™ company under the name Rheocoat™ 3800.

Thickener B4, an ASE type acrylic thickener marketed by the COATEX™ company under the name Rheocoat™ 12.

Thickener B5, an HASE type acrylic thickener marketed by the COATEX™ company under the name Rheocoat™ 3000.

CMC, a carboxymethyl cellulose marketed by the BASF™ company under the name Finnfix™ 10.

Tests No. 35 to 41

These tests use in the paper coating 0.45% by dry weight (in relation to the dry weight of calcium carbonate):
- of polymer A1 completely neutralized by the sodium hydroxide (test No. 35 according to the art),
- of a formulation that is a mixture of water, thickener B1, B2 or B3 and polymer A1, partially neutralized by the sodium hydroxide at the level of stage a) of the process of the invention (tests No. 36 to 41 according to the invention).

The results of these tests are given in table 5.

TABLE 5

| | | Prior Art | Invention | | | | | |
|---|---|---|---|---|---|---|---|---|
| | Test No. | 35 | 36 | 37 | 38 | 39 | 40 | 41 |
| Formulation tested | Composition | A1 | A1/B1/water (22.5/2.5/75) | A1/B1/water (20/5/75) | A1/B2/water (22.5/2.5/75) | A1/B2/water (20/5/75) | A1/B3/water (22.5/2.5/75) | A1/B3/water (20/5/75) |
| | pH | 7.15 | 6.25 | 5.94 | 6.17 | 5.95 | 6.12 | 5.93 |
| | stability | — | stable | stable | stable | stable | stable | Stable |
| | μ100 (mPa·s) | 190 | 710 | 510 | 430 | 330 | 520 | 400 |
| Paper coating | μ10 (mPa·s) | 1200 | 9820 | 16040 | 6620 | 10100 | 11960 | 16000 |
| | μ100 (mPa·s) | 510 | 1810 | 2675 | 1135 | 1790 | 2195 | 2765 |
| | ACAV $10^6 s^{-1}$ (mPa·s) | 180 | 185 | 230 | 191 | 192 | 208 | 204 |
| | retention (g/m2) | 128 | 62 | 57 | 64 | 54 | 60 | 56 |
| Coated paper | W(CIE) | 109 | 109 | 109 | 109 | 109 | 109 | 109 |
| | Brightness TAPPI75 | 76 | 76 | 76 | 76 | 76 | 76 | 76 |

Tests Nos. 42 to 48

These tests use in the paper coating 0.45% by dry weight (in relation to the dry weight of calcium carbonate):
- of polymer A2 completely neutralized by the sodium hydroxide (test No. 42 according to the prior art),
- of a formulation that is a mixture of water, thickener B1, B2 or B3 and polymer A2, partially neutralized by the sodium hydroxide at the level of stage c) of the process of the invention (tests No. 43 to 48 according to the invention).

The results of these tests are given in table 6.

TABLE 6

| | | Prior Art/Invention | | | | | | |
|---|---|---|---|---|---|---|---|---|
| | | Prior Art | Invention | | | | | |
| | Test No. | 42 | 43 | 44 | 45 | 46 | 47 | 48 |
| Formulation tested | Composition | A2 | A2/B1/water (22.5/2.5/75) | A2/B1/water (20/5/75) | A2/B2/water (22.5/2.5/75) | A2/B2/water (20/5/75) | A2/B3/water (22.5/2.5/75) | A2/B3/water (20/5/75) |
| | pH | 7.05 | 6.17 | 5.95 | 6.03 | 5.90 | 6.07 | 5.93 |
| | stability | — | stable | stable | stable | stable | stable | Stable |
| | $\mu 100$ (mPa·s) | 310 | 1000 | 790 | 670 | 510 | 710 | 590 |
| Paper coating | $\mu 10$ (mPa·s) | 8200 | 15160 | 18800 | 14680 | 19040 | 12400 | 18200 |
| | $\mu 100$ (mPa·s) | 670 | 2615 | 2990 | 2430 | 2945 | 2330 | 3035 |
| | ACAV $10^6 s^{-1}$ (mPa·s) | 190 | 203 | 213 | 196 | 199 | 192 | 196 |
| | retention (g/m2) | 107 | 57 | 54 | 59 | 57 | 60 | 56 |
| Coated paper | W(CIE) | 108 | 108 | 109 | 108 | 109 | 109 | 108 |
| | Brightness TAPPI75 | 73 | 75 | 76 | 74 | 73 | 74 | 75 |

Tests Nos. 49 to 53

These tests use in the paper coating 0.45% by dry weight (in relation to the dry weight of calcium carbonate):

of polymer A3 completely neutralized by the sodium hydroxide (test No. 49 according to the prior art), of a formulation that is a mixture of water, thickener B4 or B5 and polymer A3, partially neutralized by the sodium hydroxide at the level of stage a) of the process of the invention (tests No. 50 to 53 according to the invention).

The results of these tests are given in table 7.

TABLE 7

| | | Prior Art/Invention | | | | |
|---|---|---|---|---|---|---|
| | | Prior Art | Invention | | | |
| | Test No. | 49 | 50 | 51 | 52 | 53 |
| Formulation tested | Composition | A3 | A3/B4/water (22.5/2.5/75) | A3/B4/water (20/5/75) | A3/B5/water (22.5/2.5/75) | A3/B5/water (20/5/75) |
| | pH | 7.05 | 6.81 | 6.52 | 6.27 | 6.04 |
| | stability | — | stable | stable | stable | stable |
| | $\mu 100$ (mPa·s) | 520 | 980 | 970 | 1000 | 890 |
| Paper coating | $\mu 10$ (mPa·s) | 3250 | 7140 | 6460 | 7160 | 9240 |
| | $\mu 100$ (mPa·s) | 500 | 950 | 850 | 1440 | 1700 |
| | ACAV $10^6 s^{-1}$ (mPa·s) | 180 | 194 | 192 | 194 | 198 |
| | retention (g/m2) | 107 | 88 | 84 | 77 | 75 |
| Coated paper | W(CIE) | 108 | 108 | 108 | 108 | 108 |
| | Brightness TAPPI75 | 74 | 79 | 79 | 78 | 77 |

Tests Nos. 54 to 58

These tests use in the paper coating 0.45% by dry weight (in relation to the dry weight of calcium carbonate):

of polymer A4 completely neutralized by the sodium hydroxide (test No. 54 according to the prior art), of a formulation that is a mixture of water, thickener B4 or B5 and polymer A4, partially neutralized by the sodium hydroxide at the level of stage a) of the process of the invention (tests No. 55 to 58 according to the invention).

The results of these tests are given in table 8.

TABLE 8

Prior Art/Invention

|  |  | Prior Art | Invention | | | |
|---|---|---|---|---|---|---|
| Test No. | | 54 | 55 | 56 | 57 | 58 |
| Formulation tested | composition | A4 | A4/B4/water (22.5/2.5/75) | A4/B4/water (20/5/75) | A4/B5/water (22.5/5/75) | A4/B5/water (20/5/75) |
| | pH | 7.05 | 6.81 | 6.52 | 6.27 | 6.04 |
| | stability | — | stable | stable | stable | stable |
| | μ100 (mPa·s) | 320 | 1080 | 1120 | 1200 | 1090 |
| Paper coating | μ10 (mPa·s) | 7050 | 7940 | 8460 | 8260 | 10020 |
| | μ100 (mPa·s) | 600 | 1150 | 1210 | 1780 | 1980 |
| | ACAV $10^6\,s^{-1}$ (mPa·s) | 190 | 212 | 223 | 225 | 224 |
| | retention (g/m2) | 106 | 72 | 71 | 73 | 70 |
| Coated paper | W(CIE) | 108 | 108 | 108 | 108 | 108 |
| | Brightness TAPPI75 | 74 | 75 | 75 | 74 | 76 |

For each of the groups of tests enumerated above, that is for each of the tables No. 5 to 8, it is observed that:
- all of the aqueous formulations according to the invention have a pH between 5.5 and 6.5; they are stable and have a Brookfield™ viscosity of 25° C. at 100 rotations per minute of less than 1,500 mPa·s, and in certain cases much less than 1,000 mPa·s,
- the paper coatings made according to the invention are thicker than those of the prior art: they have low gradient shear viscosities (Brookfield™ at 25° C., at 10 and 100 rotations per minute) and a very high shear gradient (ACAV), higher than those measured for the prior art,
- the coated papers according to the invention have a whiteness and a brightness at least equal to those obtained in the case of coated paper according to the prior art.

In conclusion, the formulations according to the invention allow thickening of a paper coating across broad value intervals of viscosity, as well as at a low to high shear gradient.

These formulations simultaneously give the paper coatings water retention as well as activation of the brightness and optical azuration to the papers coated with said coatings, at least equal to those obtained with products of the prior art.

Tests Nos. 59 to 63

For each of these tests, one uses an amount of the product to be tested (according to the invention or the prior art) adjusted by the person skilled in the art so as to obtain a Brookfield™ viscosity (100 rotations per minute, and at 25° C.) equal to 2,000±100 mPa·s.

These tests use:
CMC, polymer A3, thickeners B1 and B2 for the prior art (Tests No. 59 to 62),
and a formulation that is a mixture of water, thickener B2 and polymer A3, partially neutralized by the sodium hydroxide at the level of stage a) of the process of the invention (test No. 63); the latter mixture is stable and has a Brookfield™ viscosity at 25° C. and at 100 revolutions a minute equal to 780 mPa·s.

The results of these tests are given in table 9 below:

TABLE 9

Prior Art/Invention

|  |  | Prior Art | | | | Invention |
|---|---|---|---|---|---|---|
| Test No. | | 59 | 60 | 61 | 62 | 63 |
| Formulation tested | composition | CMC | A3 | B1 | B2 | A3/B2/water (20/5/75) |
| Paper coating | retention (g/m2) | 120 | 75 | 110 | 80 | 57 |
| Coated paper | W(CIE) | 108 | 109 | 105 | 105 | 109 |
| | Brightness TAPPI75 | 71 | 77 | 70 | 72 | 77 |

It is noticed that among all of the products tested, it is the formulation according to the invention that yields the best results in regard to water retention, brightness and optical azuration.

The invention claimed is:

1. A process for manufacturing an aqueous formulation, which comprises:
   a) preparing an aqueous solution of at least one comb polymer 1) of (meth)acrylic acid onto which is grafted a function of alkoxy and/or hydroxy polyalkylene glycol,
   b) preparing an aqueous emulsion of at least one acrylic thickener 2), and
   c) mixing the aqueous solution from a) with the aqueous emulsion from b), optionally adding water,
   wherein the comb polymer is partially neutralized during a) and/or c), in such a way as to obtain a mixture whose pH is between 5.5 and 6.8.

2. The process according to claim 1, wherein the formulation resulting from c) comprises a dry matter content of 20% to 35% of its total weight.

3. The process according to claim 1, wherein the formulation resulting from c) comprises a dry-weight content of comb polymer 1) used during a) of 70% to 95% of its total dry material.

4. The process according to claim 1, wherein the mixture resulting from c) presents a Brookfield™ viscosity measured at 25° C. and at 100 revolutions per minute, of less than 1,500 mPa.s.

5. The process according to claim 1, wherein the acrylic thickener 2) used in b) is an acrylic thickener of the ASE (alkali-soluble emulsion) or HASE (hydrophobically modified alkali-soluble emulsion) type.

6. The process according to claim 1, wherein within the comb polymer 1) used during a), the alkoxy and/or hydroxy polyalkylene glycol function is brought by a formula (I) monomer:

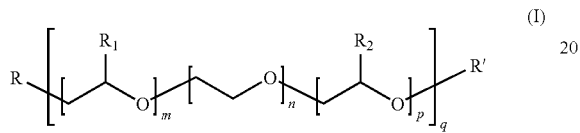

in which:
m, n, p and q are integers and m, n, p ≤150, q ≥1 and 5 ≤(m+n+p)q ≤150,
$R_1$ represents hydrogen or the methyl or ethyl radical,
$R_2$ represents hydrogen or the methyl or ethyl radical,
R represents a radical containing a polymerizable unsaturated function, selected from a member of one of the following groups: the group of vinylics; the group of acrylic, methacrylic, and maleic esters, the group of acrylurethane, methacrylurethane, α-α' dimethyl-isopropenyl-benzylurethane, and allylurethane, the group of allylic or vinylic ethers, whether substituted or not, and the group of ethylenically unsaturated amides or imides, and
R' represents hydrogen or a hydrocarbonated radical having 1 to 40 carbon atoms, or an ionic or ionizable phosphate, phosphonate, sulfate, sulfonate, or carboxylic group, or a primary, secondary or tertiary amine, or a quaternary ammonium, or a mixture thereof.

7. The process according to claim 6, wherein the comb polymer 1) used during a) contains, as a percentage by weight of each of its constituents, the sum of the percentages equal to 100%, from 6% to 40% of (meth)acrylic acid, and from 60% 94% of a formula (I) monomer.

8. The process according to claim 1, wherein the comb polymer 1) used during a), is partially neutralized by one or more neutralization agents chosen from the sodium and potassium hydroxides and mixtures thereof.

9. An aqueous formulation comprising:
1) at least one comb polymer of (meth)acrylic acid onto which is grafted a function of alkoxy and/or hydroxy polyalkylene glycol,
2) at least one acrylic thickener, and
3) water,
wherein the comb polymer is partially neutralized in such a way that the pH of said formulation is between 5.5 and 6.8.

10. The aqueous formulation according to claim 9, wherein it comprises a dry material content comprising 20% to 35% of its total weight.

11. The aqueous formulation according to claim 9, wherein it comprises a dry weight content of comb polymer 1) comprising 70% to 95% of its total dry material.

12. The aqueous formulation according to claim 9, wherein it presents a Brookfield™ viscosity measured at 25° C. and at 100 revolutions per minute, of less than 1500 mPa.s.

13. The aqueous formulation according to claim 9, wherein the acrylic thickener 2) is an acrylic thickener of the ASE (alkali-soluble emulsion) or HASE (hydrophobically modified alkali-soluble emulsion) type.

14. The aqueous formulation according to claim 9, wherein within the comb polymer 1) the alkoxy and/or hydroxy polyalkylene glycol function is brought by a formula (I) monomer:

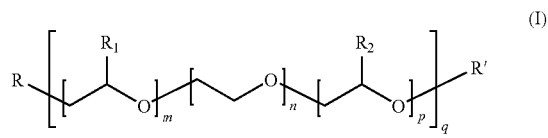

in which:
m, n, p and q are integers and m, n, p ≤150, q ≥1 and 5 ≤(m+n+p)q ≤150,
$R_1$ represents hydrogen or the methyl or ethyl radical,
$R_2$ represents hydrogen or the methyl or ethyl radical,
R represents a radical containing a polymerizable unsaturated function, selected from a member of one of the following groups: the group of vinylics; the group of acrylic, methacrylic, and maleic esters, the group of acrylurethane, methacrylurethane, α-α' dimethyl-isopropenyl-benzylurethane, and allylurethane, the group of allylic or vinylic ethers, whether substituted or not, and the group of ethylenically unsaturated amides or imides, and
R' represents hydrogen or a hydrocarbonated radical having 1 to 40 carbon atoms, or an ionic or ionizable phosphate, phosphonate, sulfate, sulfonate, or carboxylic group, or a primary, secondary or tertiary amine, or a quaternary ammonium, or a mixture thereof.

15. The aqueous formulation according to claim 14, wherein the comb polymer 1) contains, as a percentage by weight of each of its constituents, the sum of the percentages equal to 100%, from 6% to 40% of (meth)acrylic acid, and from 60% to 94% of a formula (I) monomer.

16. The aqueous formulation according to claim 9, wherein the comb polymer 1) is partially neutralized by one or more neutralization agents chosen from the sodium and potassium hydroxides and mixtures thereof.

17. A coating for paper comprising the aqueous formulation according to claim 9.

18. A thickening agent for a paper coating composition comprising the aqueous formulation according to claim 9.

19. A water-retention agent for a paper coating composition comprising the aqueous formulation according to claim 9.

20. An agent for improving the brightness and/or the optical azuration of a paper coating composition comprising the aqueous formulation according to claim 9.

* * * * *